E. Ford.
Granary.
N° 11,830. Patented Oct. 24, 1854.
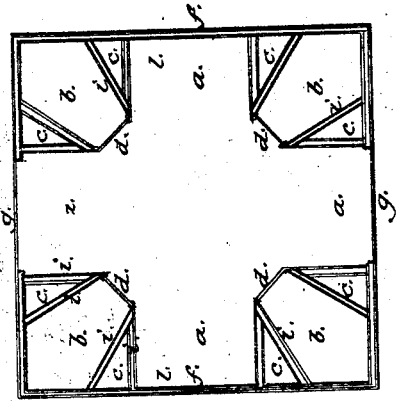
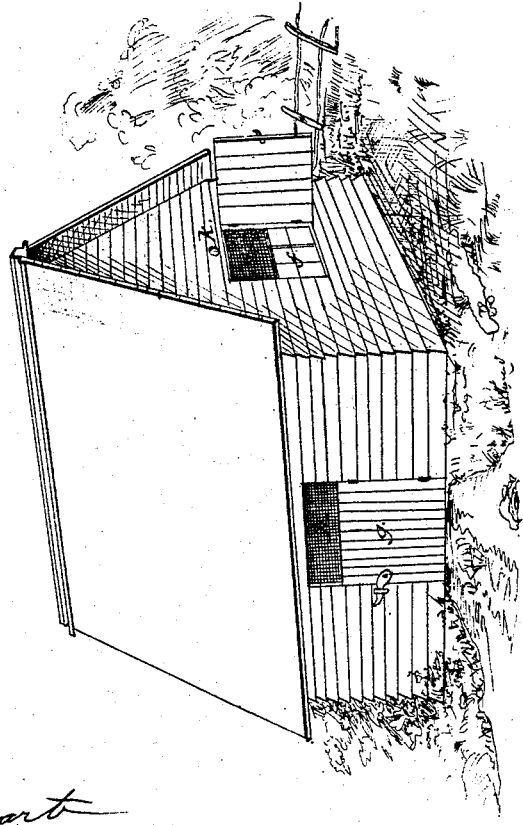
Witnesses:
Joseph M Ford
George W. Stewart
Inventor:
Ebenezer Ford

UNITED STATES PATENT OFFICE.

EBENEZER FORD, OF SPRING COTTAGE, MISSISSIPPI.

GRANARY.

Specification of Letters Patent No. 11,830, dated October 24, 1854.

*To all whom it may concern:*

Be it known that I, EBENEZER FORD, of Spring Cottage, in the county of Marion and State of Mississippi, have invented a new and useful Improvement in Granaries for Storing Grain of all Descriptions; and I do hereby declare that the following is a full and exact description thereof.

The nature of my improvement consists in erecting a building having double walls and double floors, furnishing the same with double partitions; the walls, floors, and partitions being filled in with salt, in order to prevent the attacks of insects.

To enable others skilled in the art to make and use my invention I will proceed to describe its construction and operation, reference being had to the annexed drawings forming part of this specification, in which—

Figure 1 is a perspective view of my improved granary. Fig. 2 a horizontal section of the same.

Similar letters refer to like parts.

*a*, flooring; *b*, *c*, compartments; *d*, doors; *e*, gauze; *f*, window; *g*, door; *h*, gauze; *i*, partitions; *k*, smoke-hole; *l*, walls.

The building intended for a granary constructed on my plan is built in the usual manner except that the walls, *l*, are made double, one inside of the other, the space between being filled in with salt. The partitions *i*, are also constructed in the same manner, so that between the different compartments *a*, *b*, *c*, there are double partitions containing a filling of salt.

When the granary is finished and ready for use, the floor should be saturated with salt-brine. The house is now to be smoked by the introduction of a stove-pipe through the hole, *k*, the pipe being connected outside with an ordinary stove, the smoke being carried through the hole, *k*, directly into the interior of the building. Sawdust or any kind of wood used in smoking meat will answer. When the house is being smoked the doors and windows should all be closed, but in clear weather the windows may be opened for ventilation. The grain may now be put in; and if in bulk, it should be thrown up against the walls, slanting down toward the corners of the garners.

I should have mentioned that the partitions between the compartments are high, where they join the walls of the building, and slant down quite low toward the center of the same, which permits the introduction of light in the various parts. The house should be smoked at least once a month with sulfur, and likewise with wood or saw-dust during cloudy or sultry weather, which are the periods when the weevil and other insects generate.

If no insects be carried into the granary with the grain none will appear during the season. Should any have been carried in they will perish, and not generate any more.

The object of the gauze at the top of the doors and the windows is to admit currents of cold air when a proper opportunity occurs.

Salt is a substance very destructive to insects. It is sometimes applied with great success as a dressing for land. Barns constructed with partitions filled with salt in the manner I have described will be perfectly free from their attacks. By the employment of smoke in the manner I have described, any superabundant moisture occasioned by the use of salt will be carried off, and the condition of the granary be at all times properly preserved.

I am aware that salt has long been used as a filling between the timbers of ships, and also between the walls of ice houses; and therefore, to such devices I make no claim. But What I do claim and desire to secure by Letters Patent is, The mode herein described for making granaries, having the walls, floors, and partitions filled in with common salt in the manner, substantially as set forth.

EBENEZER FORD.

Witnesses:
 JOSEPH M. FORD,
 GEORGE W. STEWART.